United States Patent
Quach et al.

(10) Patent No.: US 8,340,109 B2
(45) Date of Patent: *Dec. 25, 2012

(54) SYSTEMS AND METHODS FOR ACCELERATING TCP/IP DATA STREAM PROCESSING

(75) Inventors: Nhon T Quach, San Jose, CA (US); Ramesh Padmanabhan, Los Altos, CA (US); Jean Marc Frailong, Portola Valley, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 12/906,717

(22) Filed: Oct. 18, 2010

(65) Prior Publication Data

US 2011/0032941 A1 Feb. 10, 2011

Related U.S. Application Data

(63) Continuation of application No. 12/145,994, filed on Jun. 25, 2008, now Pat. No. 7,839,873, which is a continuation of application No. 10/290,311, filed on Nov. 8, 2002, now Pat. No. 7,406,087.

(51) Int. Cl.
  *H04L 12/28* (2006.01)
(52) U.S. Cl. .......... 370/401; 370/389; 370/392
(58) Field of Classification Search .......... 370/401, 370/389, 392, 229–230, 231–238, 252, 395.2; 709/250; 714/746, 748
See application file for complete search history.

(56) References Cited

U.S. PATENT DOCUMENTS

| | | | |
|---|---|---|---|
| 5,802,106 A | 9/1998 | Packer | |
| 6,434,620 B1 | 8/2002 | Boucher et al. | |
| 6,473,793 B1 | 10/2002 | Dillon et al. | |
| 6,687,247 B1 | 2/2004 | Wilford et al. | |
| 6,958,997 B1 * | 10/2005 | Bolton | 370/392 |
| 6,985,956 B2 | 1/2006 | Luke et al. | |
| 7,337,241 B2 * | 2/2008 | Boucher et al. | 709/250 |
| 7,406,087 B1 | 7/2008 | Quach et al. | |
| 7,586,871 B2 | 9/2009 | Hamilton | |
| 7,646,716 B2 * | 1/2010 | P et al. | 370/235 |
| 7,839,873 B1 | 11/2010 | Quach et al. | |
| 2002/0156927 A1 | 10/2002 | Boucher et al. | |
| 2002/0176378 A1 | 11/2002 | Hamilton et al. | |
| 2007/0067497 A1 | 3/2007 | Craft et al. | |

OTHER PUBLICATIONS

Co-pending U.S. Appl. No. 12/145,994, filed Jun. 25, 2008 entitled "Systems and Methods for Accelerating TCP/IP Data Stream Processing" by Nhon T. Quach et al., 33 pages.
U.S. Appl. No. 60/301,378 (provisional application related to 6,985,956 B2).
U.S. Appl. No. 60/245,295 (provisional application related to 6,985,956 B2).

* cited by examiner

*Primary Examiner* — Chuong T Ho
(74) *Attorney, Agent, or Firm* — Harrity & Harrity, LLP

(57) ABSTRACT

A network device includes an interface (105), a TCP/IP protocol fast processing path (115), and a TCP/IP protocol slow processing path (110). The interface (105) receives a packet and parses the packets to determine a characteristic of the packet. The TCP/IP protocol fast processing path (115) processes the packet if the characteristic of the packet includes a first characteristic. The TCP/IP protocol slow processing path (110) processes the packet if the characteristic of the packet includes a second characteristic.

17 Claims, 13 Drawing Sheets

SYSTEMS AND METHODS FOR ACCELERATING TCP/IP DATA STREAM PROCESSING

RELATED APPLICATION

This application is a continuation of U.S. application Ser. No. 12/145,994, filed Jun. 25, 2008 which is a continuation of U.S. application Ser. No. 10/290,311, filed Nov. 8, 2002, now U.S. Pat. No. 7,406,087, the disclosures of which are incorporated herein by reference.

BACKGROUND OF THE INVENTION

1. Field of the Invention

The present invention relates generally to network devices, and more particularly, to systems and methods for improving the processing efficiency of data streams in such network devices.

2. Description of Related Art

The rise of the global Internetwork, commonly called the Internet, has led to a massive expansion in data networking applications, including academic, business and industrial applications. Accompanying the growth of the Internet has been the development and adoption of TCP/IP protocol as the Internet protocol standard. Transmission control protocol (TCP) is a connection-oriented transport protocol of the Internet architecture that provides a reliable byte-stream delivery service. Internet Protocol (IP) provides a connectionless best effort delivery service of datagrams across the Internet.

TCP/IP conventionally is used in many layer 5-7 switching applications, such as web caching, file caching and content switches. Such switching applications parse TCP/IP streams to obtain the information required for intelligent switching. Switching applications conventionally implement TCP/IP fully in software. Software TCP/IP implementations, however, are slow and cannot handle many TCP/IP streams in parallel. In client/server configurations, for example, the slow speed of the TCP/IP software implementations limits the number of clients (e.g., parallel TCP/IP streams) a server can serve. This often requires that many servers be used to achieve the desired processing speed.

Therefore, there exists a need for systems and methods that can accelerate TCP/IP stream processing in switching applications so as to increase the number of parallel TCP/IP streams that a given switching application can handle efficiently.

SUMMARY OF THE INVENTION

Systems and methods consistent with the principles of the invention address this and other needs by providing a hybrid software/hardware TCP/IP approach. In this hybrid approach, a "slow path," that includes software implemented TCP/IP, processes the less common types of packets. A "fast path," that includes hardware-implemented TCP/IP, processes the most common types of packets. Since the hardware implemented TCP/IP "fast path" logic can process packets at a higher rate than the slower software-implemented TCP/IP, the overall data stream processing speed of the network device is accelerated as compared to a conventional full software TCP/IP approach. Furthermore, implementing the slow path's logic in software may significantly reduce the design and verification complexity and, therefore, the time to market.

One aspect consistent with principles of the invention is directed to a method of processing a packet. The method includes receiving the packet and parsing the packet to determine a characteristic of the packet. The method further includes processing the packet using a network protocol fast processing path if the characteristic of the packet comprises a first characteristic. The method additionally includes processing the packet using a network protocol slow processing path if the characteristic of the packet comprises a second characteristic.

A second aspect consistent with principles of the invention is directed to a method of processing a packet. The method includes receiving the packet and selectively processing the packet using one of a network protocol fast processing path and a network protocol slow processing path based on a type of the received packet.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the principles of the invention implement a hybrid software/hardware TCP/IP approach in which software implemented TCP/IP processes the less common types of packets and hardware-implemented TCP/IP processes the more common types of packets. The overall data stream processing speed of the network device may, thus, be accelerated due to the higher processing rate of the hardware-implemented TCP/IP.

Exemplary Client/Server System

Figure 1:
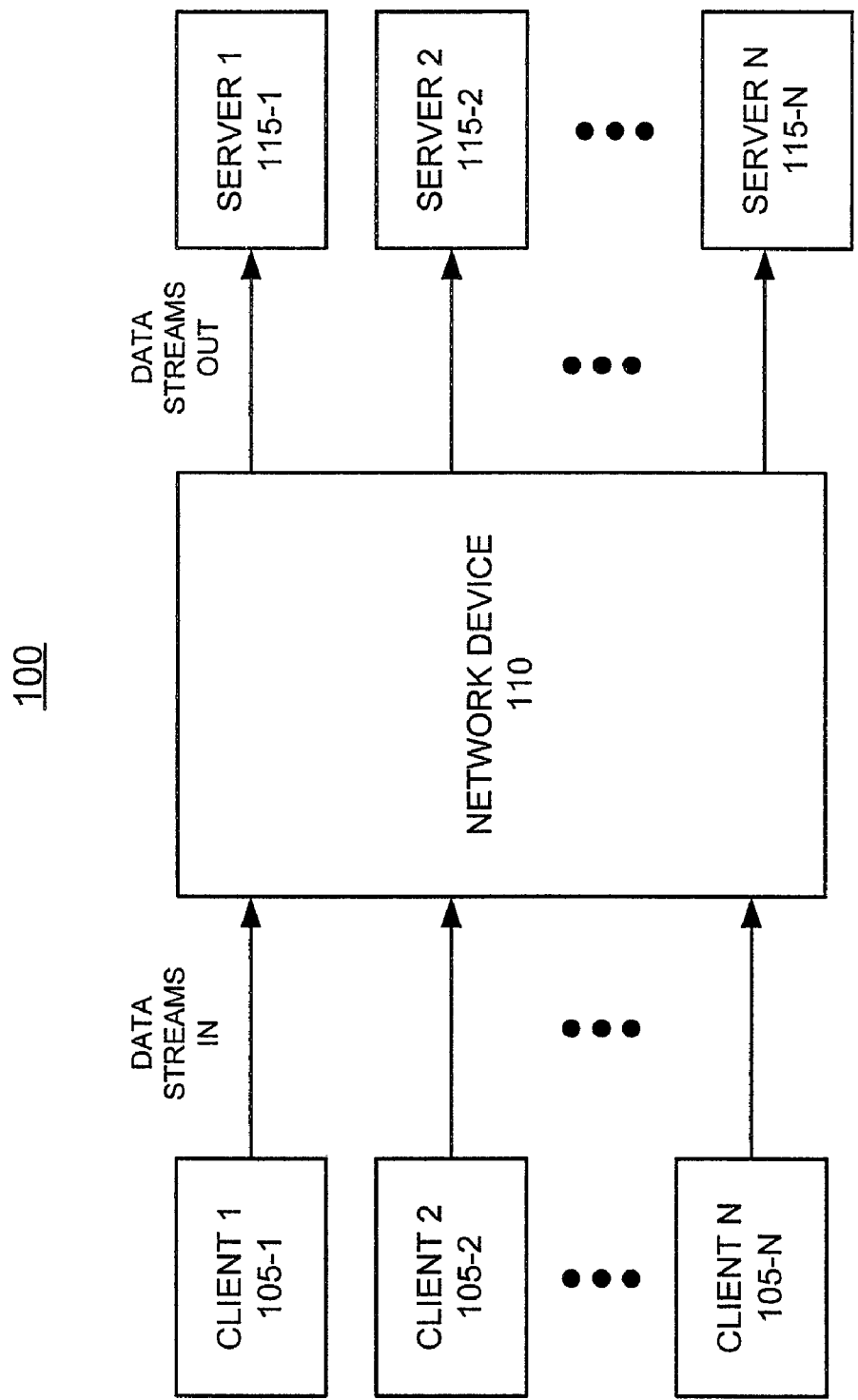
FIG. 1 is a diagram of an exemplary client/server system consistent with the principles of the invention.

FIG. 1 is a diagram of an exemplary client/server system 100 consistent with the principles of the invention may be implemented. System 100 may include multiple clients 105-1 through 105-N, a network device 110, and multiple servers 115-1 through 115-N. Each client 105 may request a service from a server 115 via network device 110. Each server 115 provides services to each client 105 as requested. Network device 110 may receive one or more TCP/IP packet streams from a client 105, processes the stream(s) according to the TCP/IP protocol and forwards the stream(s) to a server 115.

Exemplary Network Device

Figure 2:
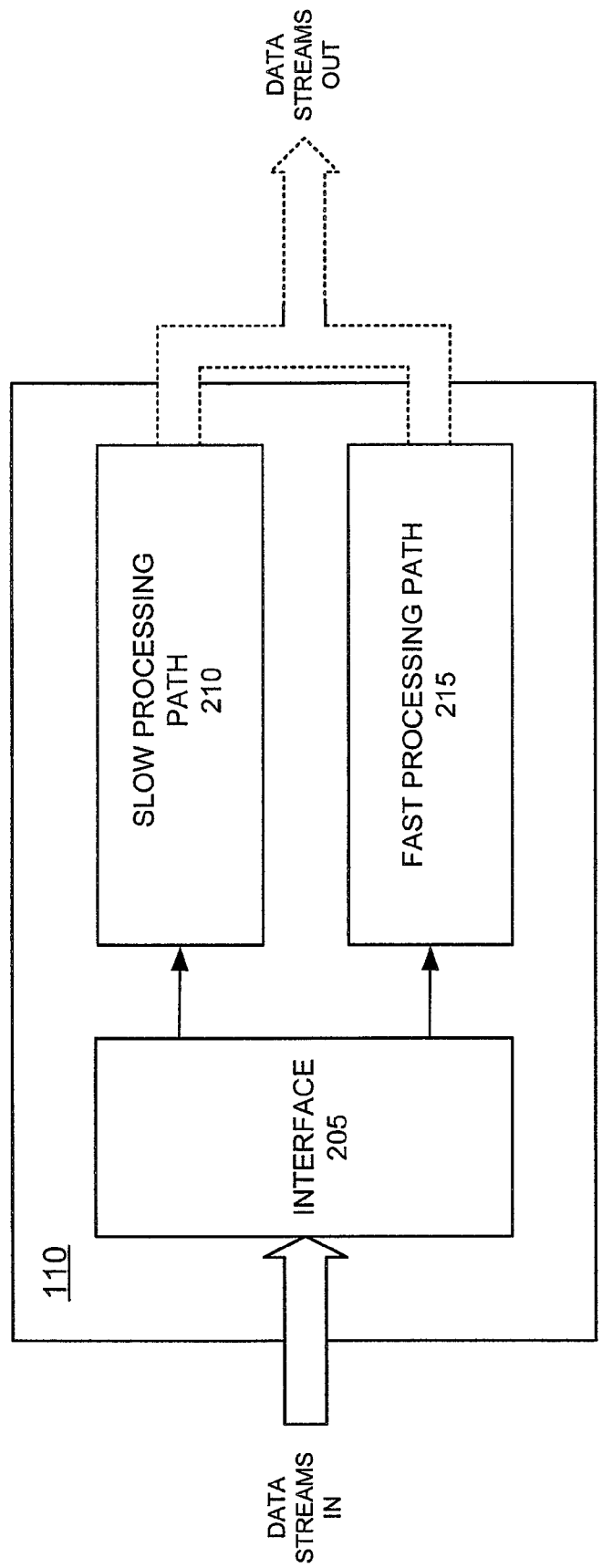
FIG. 2 is a diagram of an exemplary network device in which systems and methods consistent with the principles of the invention may be implemented.

FIG. 2 is a diagram of an exemplary network device 110 in which systems and methods consistent with the principles of the invention may be implemented. Network device 110 may receive one or more TCP/IP packet streams from clients 105, process the stream(s), and forward the stream(s) to one or more servers 115.

Network device 110 may include an interface 205, a TCP/IP slow processing path 210, and a TCP/IP fast processing path 215. Interface 205 may receive incoming streams of TCP/IP packets and determine a type of each packet. Based on this determination, interface 205 may send each received packet to either the slow processing path 210 or the fast processing path 215. Slow processing path 210 may include a processor (not shown) for processing incoming TCP/IP packets. One or more memory devices (not shown) may be associated with the slow processing path 210 to store instructions for execution by the processor, and to store data used in TCP/IP packet processing. Slow processing path 210 may perform TCP/IP packet processing in accordance with conventional software implementations. Fast processing path 215 includes a hardware implementation, consistent with the principles of the invention, that processes incoming TCP/IP packets at a faster rate than slow processing path 210.

Exemplary TCP/IP Fast Processing Path

Figure 3:
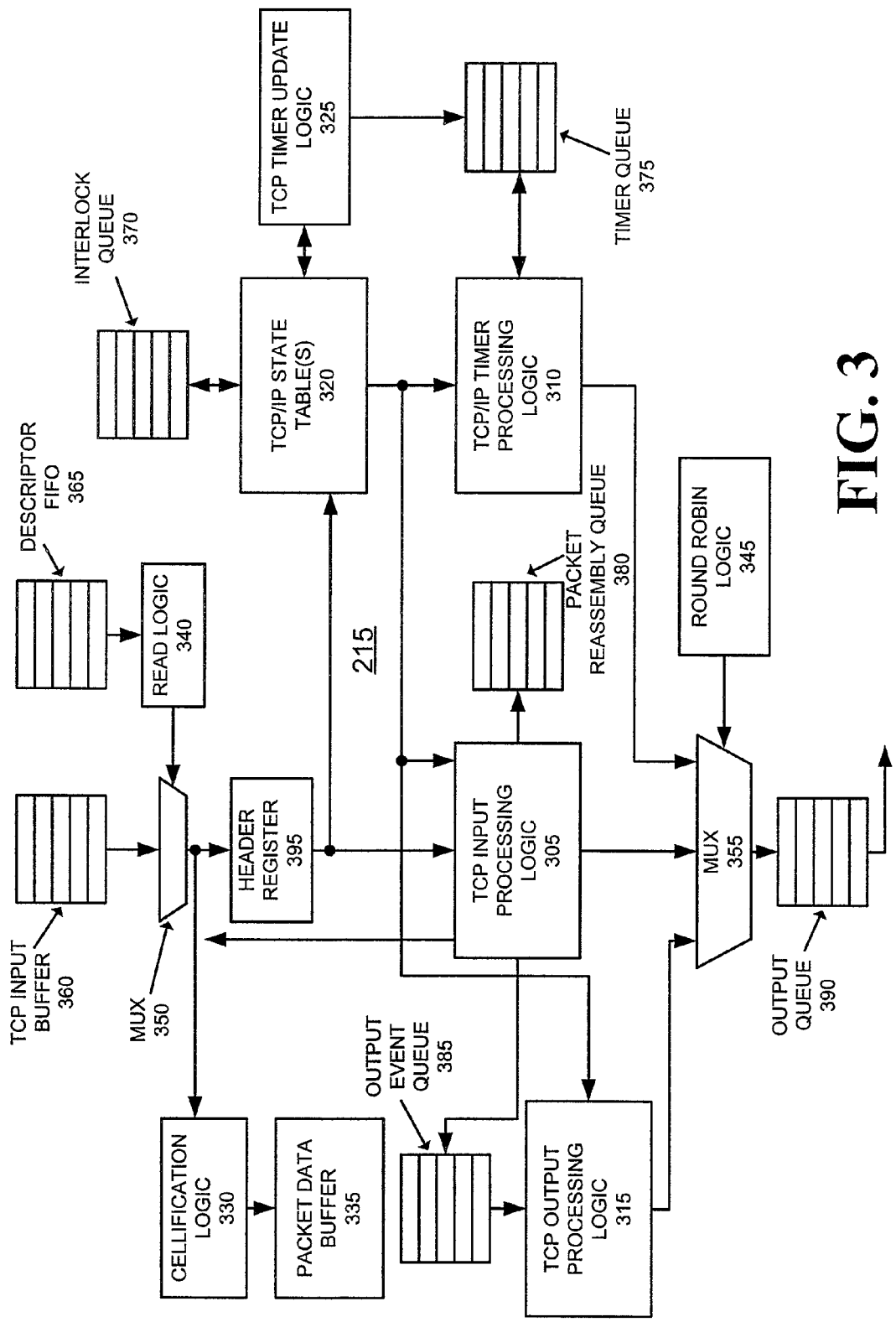
FIG. 3 is an exemplary diagram of a hardware implemented TCP/IP fast processing path consistent with the principles of the invention.

FIG. 3 is an exemplary diagram of TCP/IP fast packet processing path 215 according to an implementation consistent with principles of the invention. Fast processing path 215 may include TCP input processing logic 305, TCP timer processing logic 310, TCP output processing logic 315, TCP/IP state table 320, TCP timer update logic 325, cellification logic 330, packet data buffer 335, read logic 340 and round robin logic 345. Fast processing path 215 may further include multiplexers (MUXs) 350 and 355, TCP input buffer 360, descriptor first-in-first-out (FIFO) queue 365, interlock queue 370, timer queue 375, packet reassembly queue 380, output event queue 385, output queue 390 and header register 395.

TCP input buffer 360 may receive and store input packets in a FIFO manner. Each entry in input buffer 360 may include a full packet, including the packet header and packet data. Descriptor FIFO 365 may associate, and store, descriptors that include a starting address and a length of each packet stored in input buffer 360. Read logic 340 may control the multiplexing of packets from TCP input buffer 360, via MUX 350, according to descriptors received from descriptor FIFO 365. Cellification logic 330 may fragment received packets into cells for storage in packet data buffer 335. TCP input processing logic 305 may perform various processing functions on incoming packets (see description with regard to FIGS. 7-9 below). Packet reassembly queue 380 may include headers of segments that arrive out of order. Packet reassembly queue 380 may store the headers according to the header sequence number.

TCP/IP state table 320 may store the state of each TCP stream. State table 320 tracks each stream from the beginning, when the stream is established, to the end, when the stream is terminated. At the beginning of each stream, its state will be entered into TCP/IP state table 320 using the header information in the header register 395. The stream may then be processed according to the TCP algorithm. During this processing, the timer update logic 325 and the TCP output processing logic 315 may update the states to reflect the status of each stream. Interlock queue 370 may store the address of each entry that is being updated by timer update logic 325 or TCP output processing logic 315. A read to any entry may only be allowed to complete if there are no outstanding updates, that is, no address can be found in interlock queue 370. In this way, no corrupt states may be retrieved. TCP/IP timer processing logic 310 may process various timers stored in TCP/IP state table 320. Timer queue 375 may store timer expiration events that need to be processed immediately by timer processing logic 310.

TCP output processing logic 315 may implement TCP packet re-transmission and congestion prevention algorithms. Output event queue 385 may include pointers to TCP connections in TCP/IP state table 320 that have data to send. Entries in output event queue 385 may be enqueued as part of the input processing.

MUX 355 may multiplex the outputs of TCP output processing logic 315, TCP input processing logic 305 and TCP/IP timer processing logic 310 in round robin fashion according to commands from round robin logic 345. Output queue 390 may receive and queue the multiplexed outputs from TCP output processing logic 315, TCP input processing logic 305 and TCP/IP timer processing logic 310. Output queue 390 may include headers of packets ready to be routed. Each entry in output queue 290 may include a pointer to the packet data in packet data buffer 335.

Exemplary TCP/IP Slow Processing Path

Figure 4:
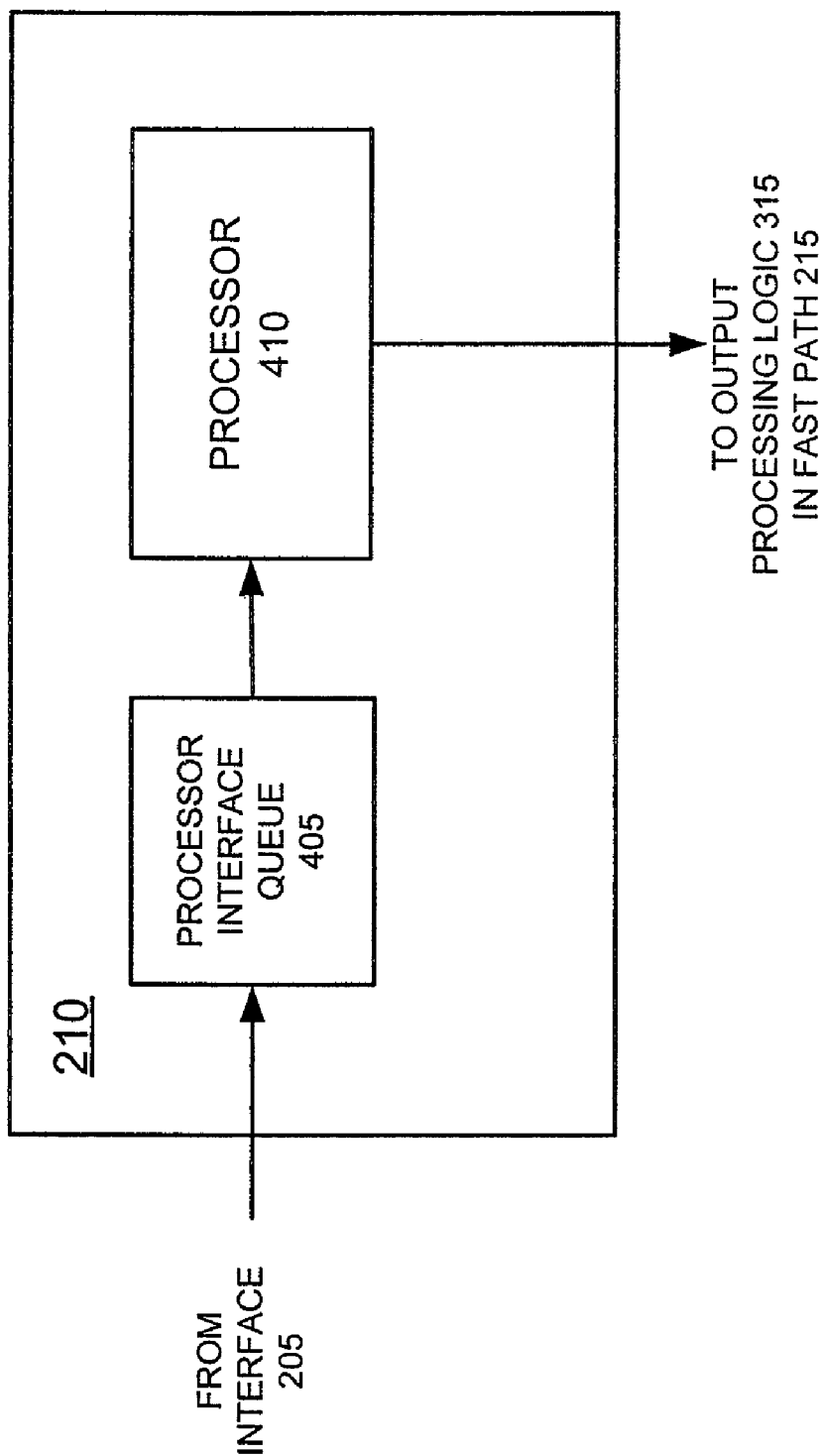
FIG. 4 is an exemplary diagram of a software implemented TCP/IP slow processing path consistent with the principles of the invention.

FIG. 4 is an exemplary diagram of TCP/IP slow processing path 210 according to an implementation consistent with principles of the invention. Slow processing path 210 may include a processor interface queue 405 and a processor 410. As interface 205 (FIG. 2) determines that a packet should be processed by slow processing path 210, interface 205 may cellify the packet and write the packet into packet data buffer 335 of fast processing path 215. A description of the packet may be sent to processor interface queue 405. Processor interface queue 405 may, in turn, send an interrupt to processor 410. Processor 405 may include, for example, a RISC Processor. Processor 410 may process the packet in a manner consistent with the TCP/IP protocol. Once this packet is processed, processor 410 may forward the packet to TCP output processing logic 315 in fast processing path 215.

Exemplary TCP/IP Packet Processing Path Selection Process

Figure 5:
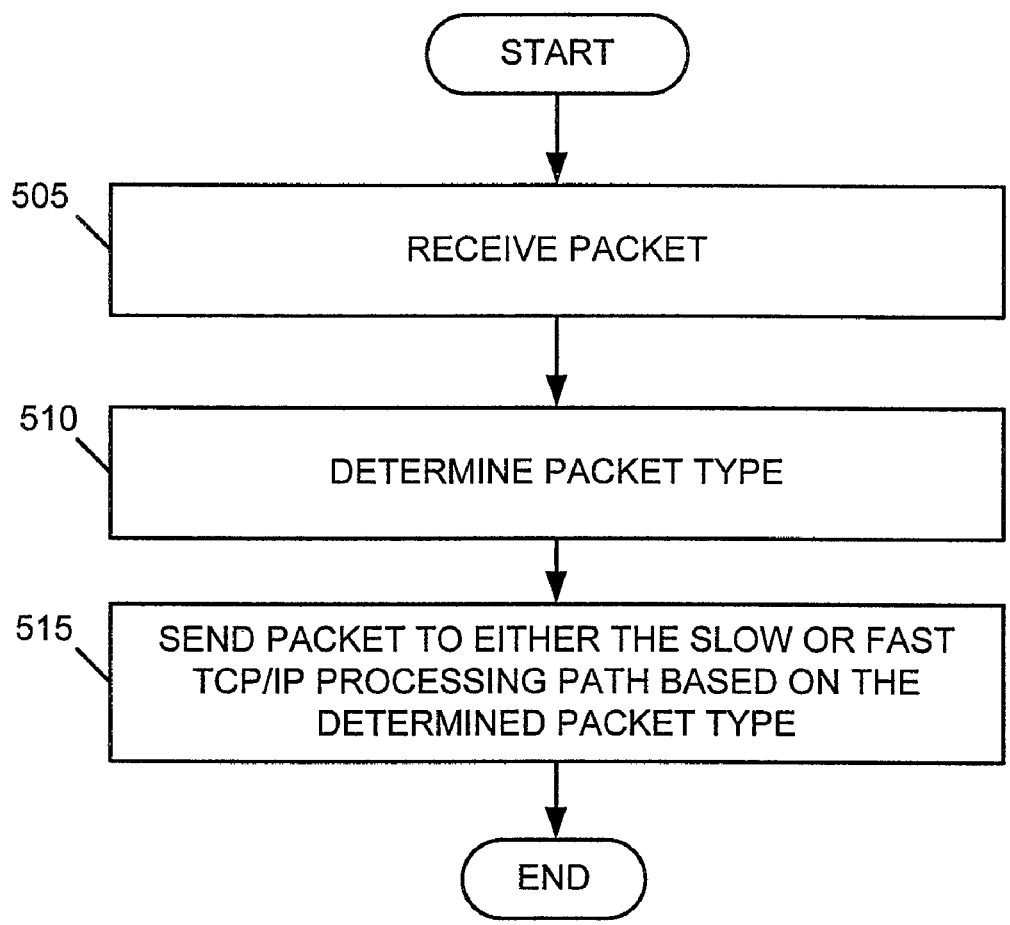
FIG. 5 is a flowchart of an exemplary process for selecting a TCP/IP data stream processing path according to an implementation consistent with principles of the invention.

FIG. 5 is a flowchart of an exemplary process for selecting either a fast or slow TCP/IP processing path in accordance with implementations consistent with the principles of the invention. The exemplary process may begin with the reception of an incoming packet at an interface 205 of network device 110 [act 505]. Interface 205 may determine the type of the packet [act 510]. For example, interface 205 may determine if the received packet is a TCP connection set-up (SYN) packet. As another example, interface 205 may determine if the received packet is a TCP data sent packet. Based on the determined packet type, interface 205 may pass the packet to either slow processing path 210 or fast processing path 215

[act 515]. For example, interface 205 may pass a TCP connection set-up packet to fast processing path 215.

Exemplary TCP/IP Fast Path Packet Processing

Figure 6:
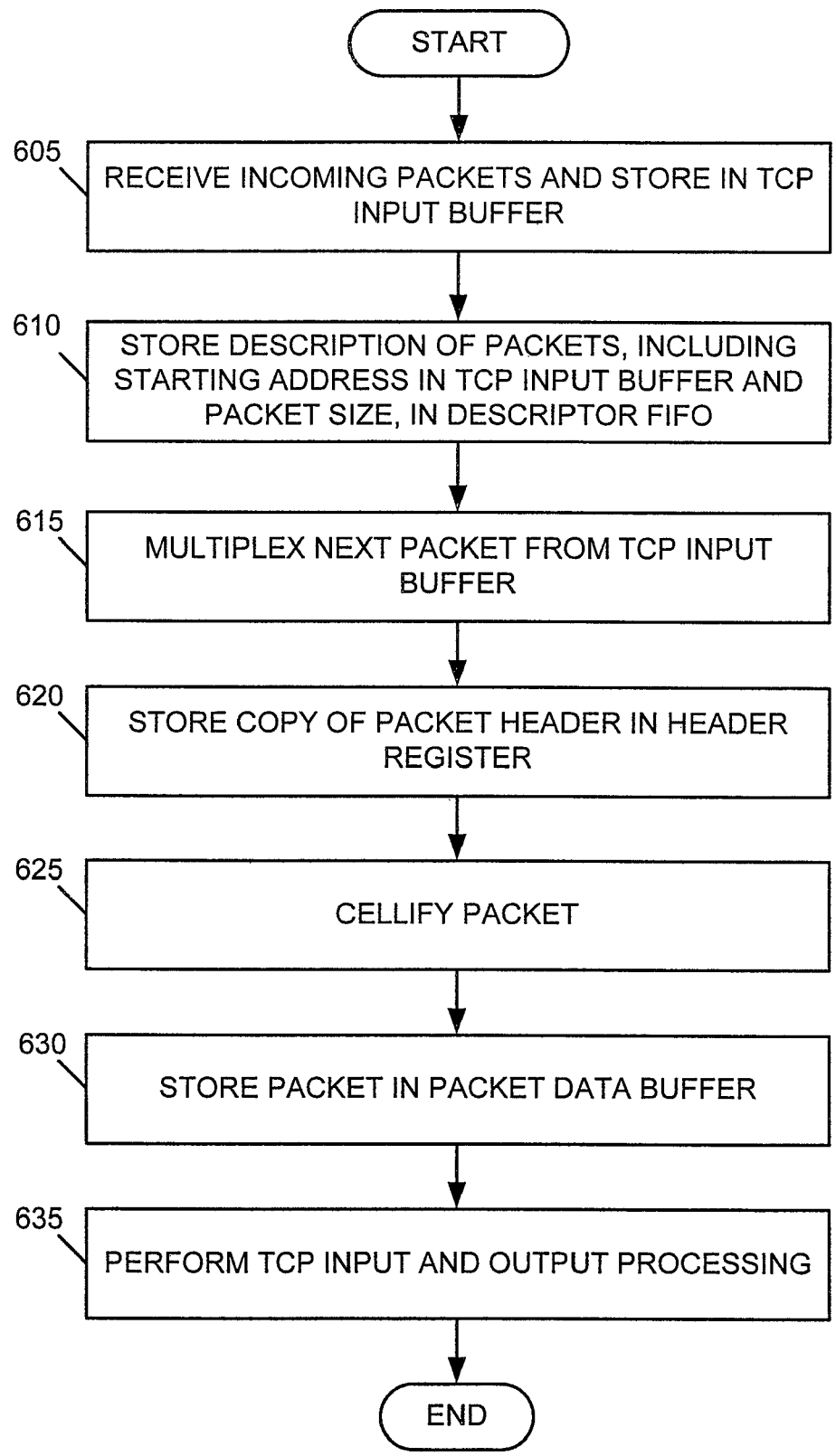
FIG. 6 is a flowchart of exemplary TCP/IP fast path packet processing according to an implementation consistent with principles of the invention.

FIG. 6 is a flowchart of exemplary TCP/IP fast path packet processing according to an implementation consistent with principles of the invention. One skilled in the art will recognize that the processing of FIG. 6 may be implemented as logic-level/register-level hardware in fast processing path 215.

Figure 7:
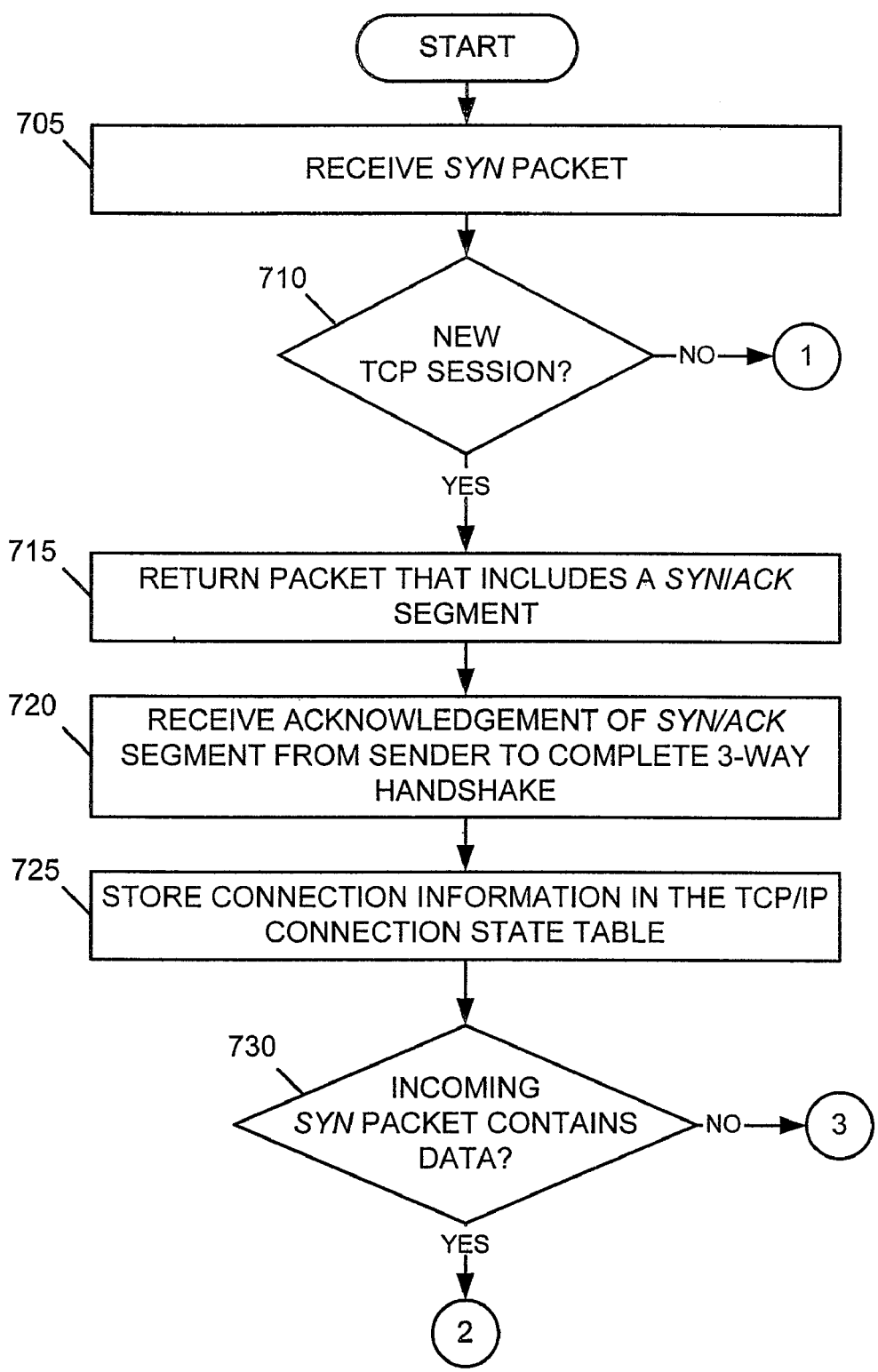
FIGS. 7-9 are flowcharts of exemplary fast path input processing according to an implementation consistent with principles of the invention.
Figure 8:
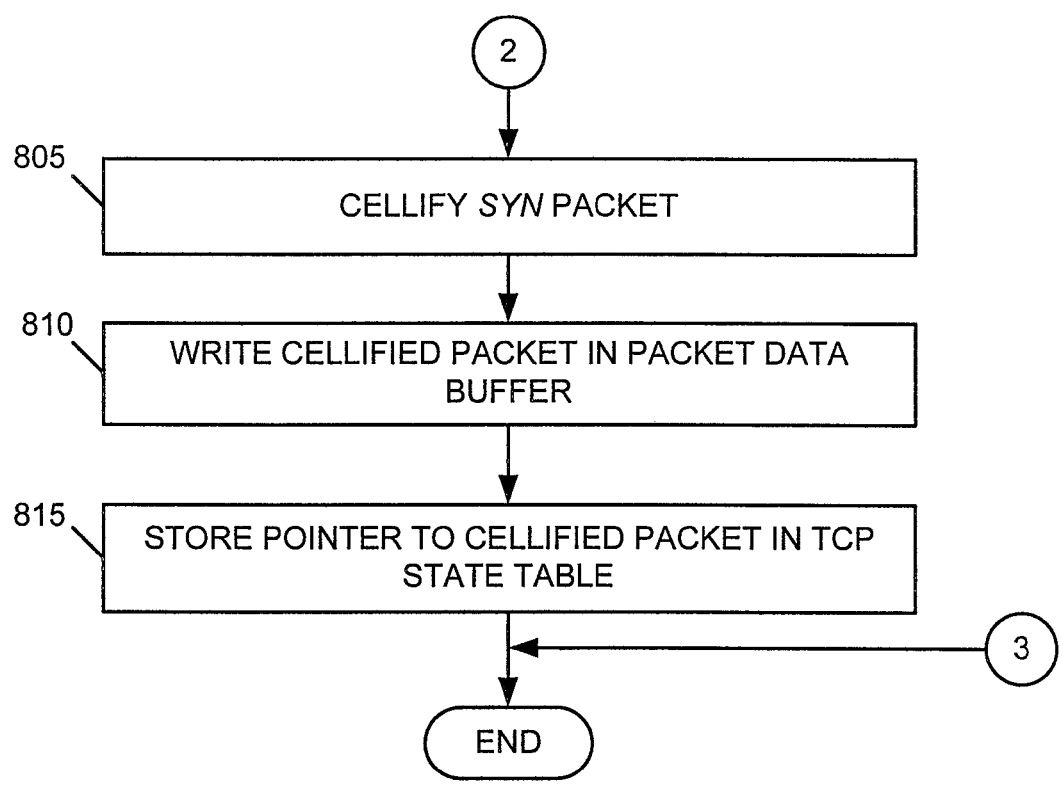
Figure 9:
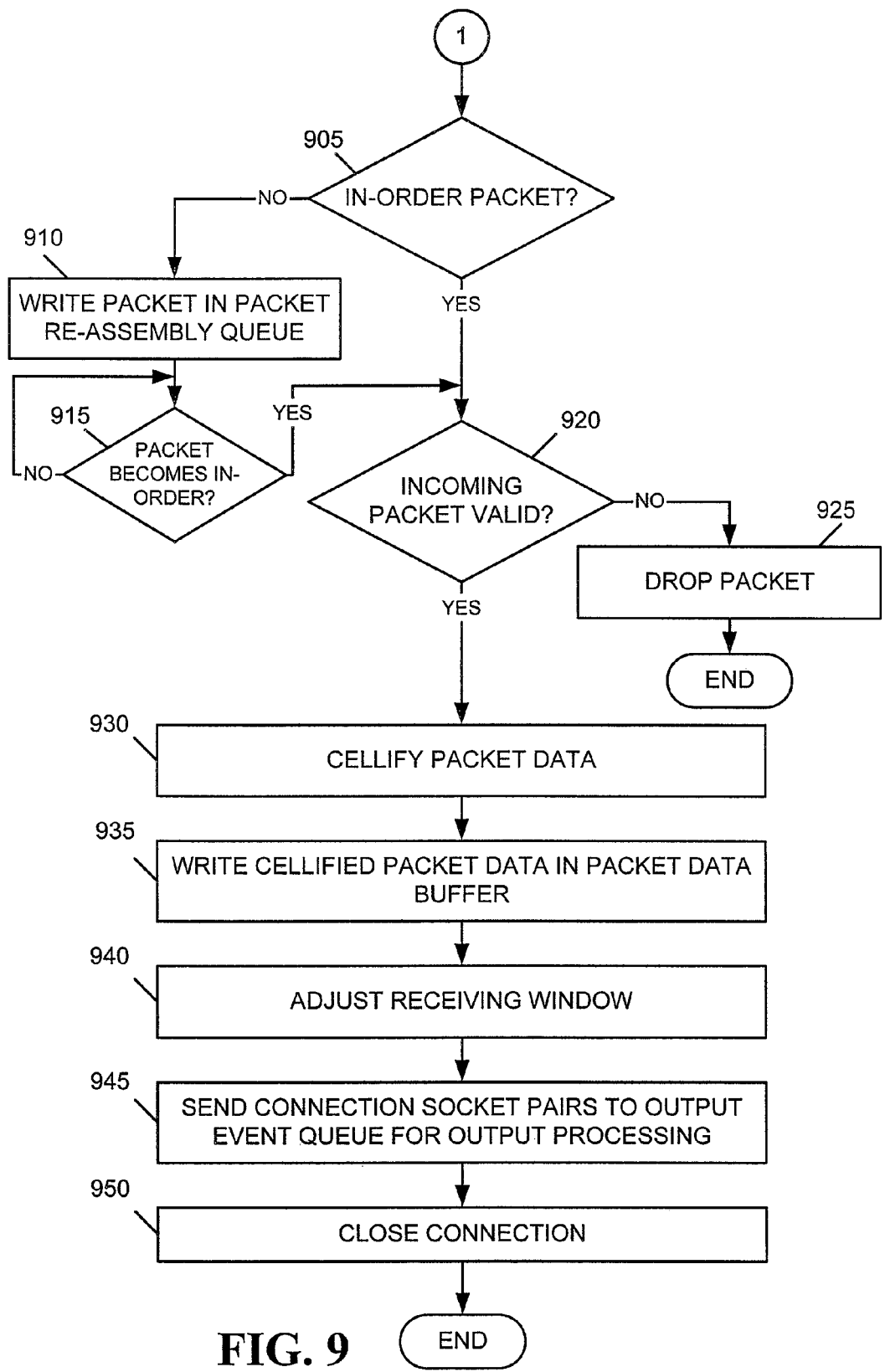

Processing may begin with the reception of one or more incoming packets and storage of the received packets in TCP input buffer 360 in a FIFO manner [act 605]. A description of each of the received packets, including a starting address for each stored packet in TCP input buffer 360, and each packet's size may be stored in descriptor FIFO 365 [act 610]. A next packet may be multiplexed from TCP input buffer 360 via MUX 350 [act 615]. A copy of the packet header of the multiplexed packet may be stored in header register 395 [act 620]. The packet may then be fragmented into cells (e.g., cellified) [act 625]. Cellification logic 330, for example, may fragment the packet into cells of fixed length. The fragmented packet may then be stored in packet data buffer 335 [act 630]. TCP input and output processing may then be performed by TCP input processing logic 305 and TCP output processing logic 315 [act 635]. Exemplary TCP input and output processing is further described below with respect to. FIGS. 7-9.

Exemplary Fast Path Input Processing

FIGS. 7-9 are flowcharts of exemplary TCP/IP fast path input processing according to an implementation consistent with principles of the invention. One skilled in the art will recognize that the processing of FIGS. 7-9 may be implemented as logic-level/register-level hardware in TCP input processing logic 305 of fast processing path 215. TCP input processing logic 305, thus, handles incoming packets in the fast path.

FIG. 7 shows how a TCP connection is established. Processing may begin with receipt of a SYN packet [act 705]. A determination of whether the received SYN packet requests a new TCP session may then be made [act 710]. If not, processing may proceed to act 905 of FIG. 9. If a received packet is a SYN segment (with a proper sequence number), indicating that a sender is requesting a new TCP session, TCP input processing logic 305 may return a packet containing a TCP SYN/ACK segment (and the proper sequence number) [act 715]. The sender will then be expected to acknowledge the SYN/ACK segment, thereby completing the required TCP three-way handshake [act 720]. Relevant information about the connection, such as, for example, the initial sequence number, sender IP address and TCP port number, and any options contained in the SYN segment, may be stored in TCP/IP state table 320 [act 725]. Since the TCP protocol allows data to be sent with the initial SYN segment, the implementation also checks if data is present in the SYN segment of the incoming SYN packet [act 730]. If the SYN segment contains data, the data may be fragmented (i.e., cellified) [act 805](FIG. 8) and written in packet data buffer 335 [act 810]. A pointer to the location of the cellified data in packet data buffer 335 may be stored in TCP state table 320 [act 815]. If the SYN segment does not contain data, then the implementation may wait for data associated with the TCP session to arrive.

If a received packet does not request a new TCP session [act 705], a determination may be made whether the packet has been received in-order relative to other packets in the incoming data stream [act 905]. If not, the out-of-order packet may be cellified and written into packet-reassembly queue 380 [act 910]. The out-of-order packet can be processed when it becomes the next in-order packet [act 915]. In-order packets may be processed immediately according to the TCP protocol. Specifically, the validity of the incoming packet may be checked [act 920]. The validity of the incoming packet may be determined by checking the packet sequence number. If the packet is invalid, the packet may be dropped [act 925]. If valid, the packet data may be fragmented into cells [act 930] and written to packet data buffer 335 [act 935]. The receiving window may be adjusted to indicate the next expected sequence number [act 940]. Connection socket pairs may be sent to output event queue 385 for processing by TCP output processing logic 315 [act 945]. The connection may then be closed, clearing timers and internal state [act 950].

Exemplary Fast Path Output Processing

Figure 10:
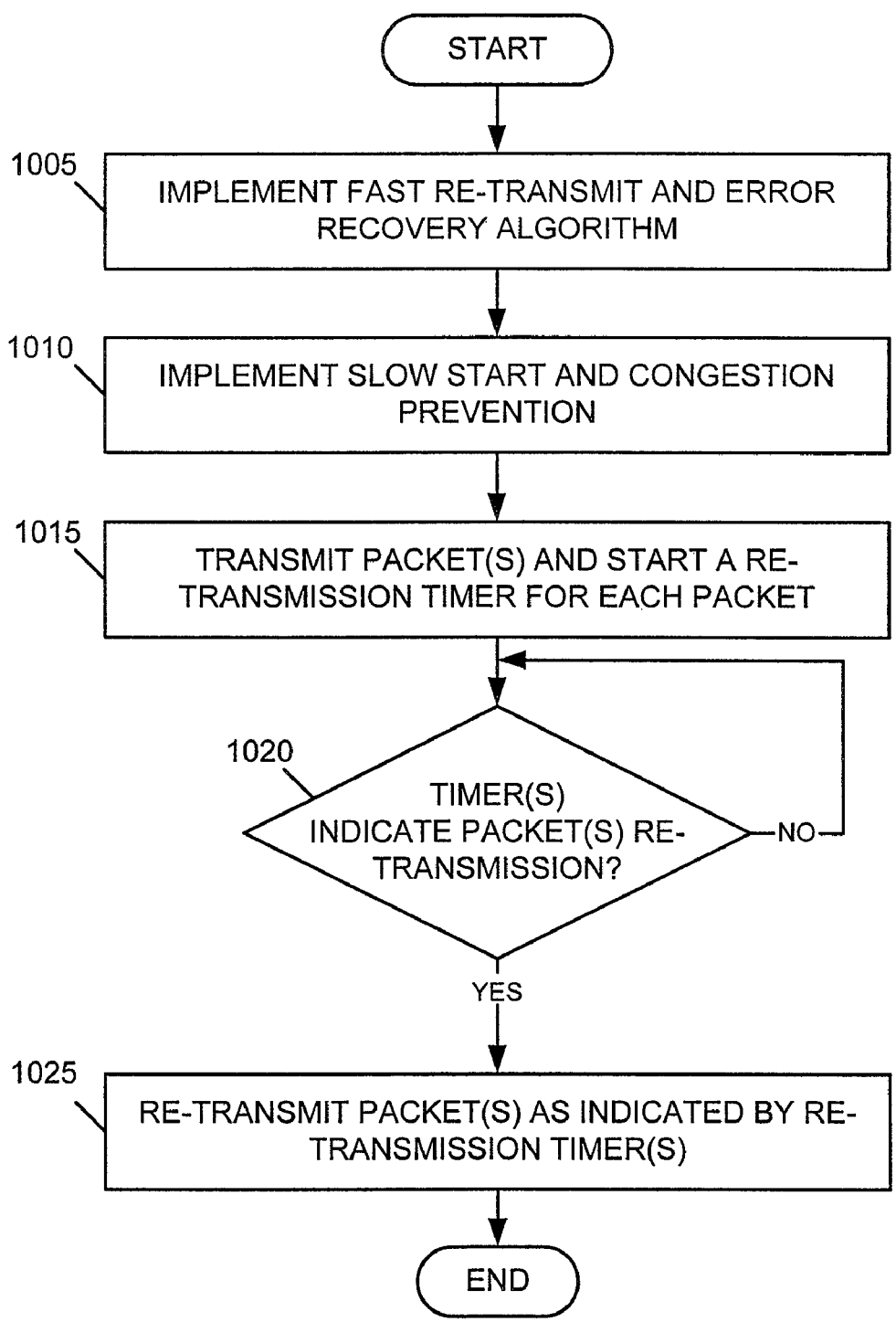
FIG. 10 is a flowchart of exemplary TCP/IP fast path output processing according to an implementation consistent with principles of the invention.

FIG. 10 is a flowchart of exemplary TCP/IP fast path output processing according to an implementation consistent with principles of the invention. One skilled in the art will recognize that the processing of FIG. 10 may be implemented as logic-level/register-level hardware in TCP output processing logic 315 of fast processing path 215.

Processing may begin with the implementation of a fast re-transmit and recovery algorithm [act 1005]. In a fast re-transmission algorithm, TCP output processing logic 315 does not wait for the re-transmit timer to expire, which may take a long time. Instead, TCP output processing logic 315 attempts to predict when a packet is lost based on the number of duplicate ACK segments received and pro-actively sends out the lost packet. Immediately after sending this packet, TCP output processing logic 315 returns to the packets that it is currently sending. This latter behavior is often referred to fast recovery since it does not follow that standard TCP slow start method. For each packet that is transmitted, TCP output processing logic 315 starts a re-transmission timer. This timer will be monitored to determine whether the timer has expired and required a re-transmission. A slow start and congestion prevention algorithm may further be implemented [act 1010]. A packet may then be transmitted and, for each transmitted packet, a re-transmission timer may be started [act 1015]. Each re-transmission timer may be monitored to determine whether the timer indicates a corresponding packet needs to be re-transmitted [act 1020]. If so, the appropriate packet(s) may be re-transmitted as indicated by a corresponding re-transmission timer [act 1025].

Exemplary TCP/IP Timer Processing

Figure 11:
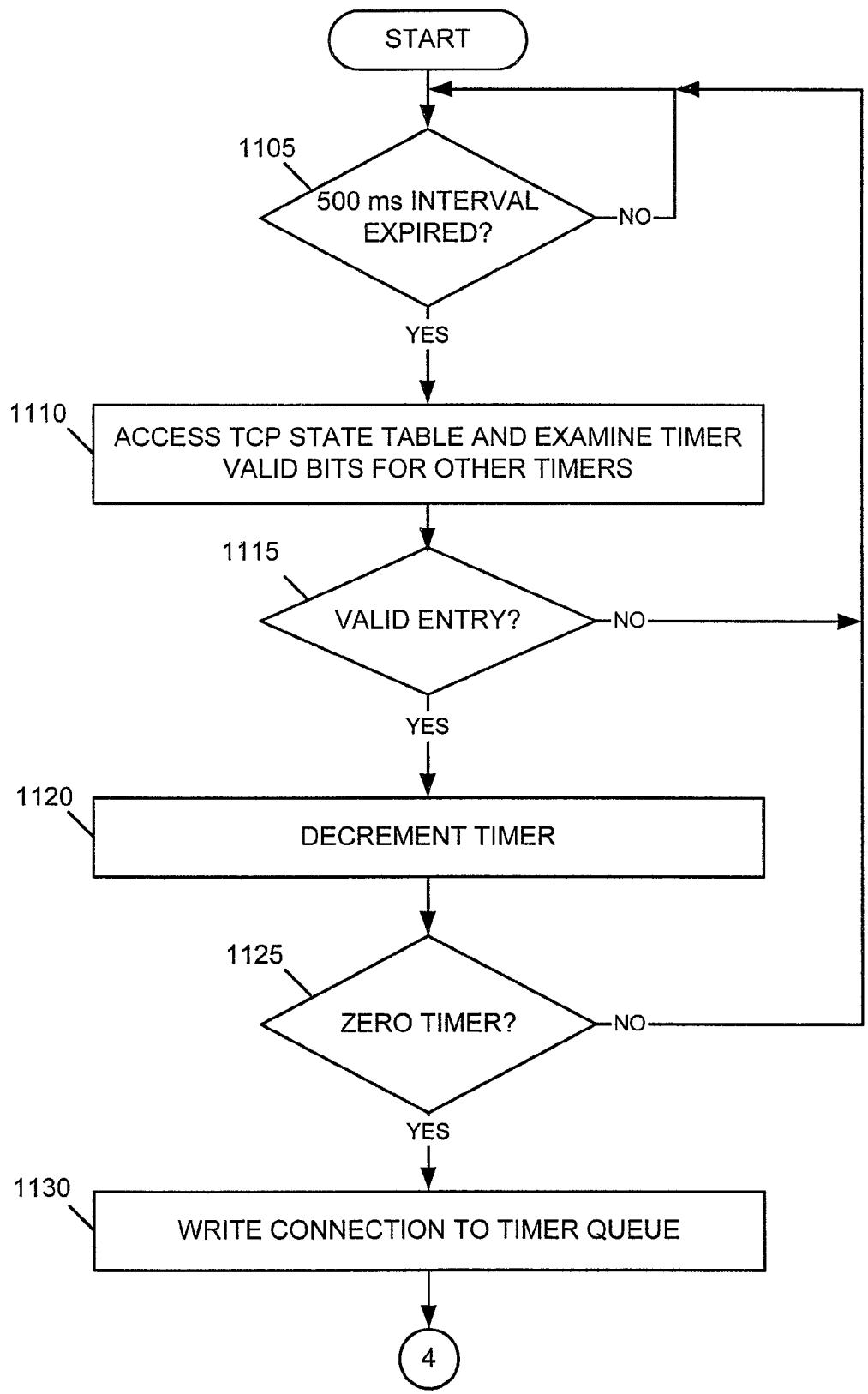
FIGS. 11-13 are flowcharts of exemplary TCP/IP timer processing according to an implementation consistent with principles of the invention.
Figure 12:
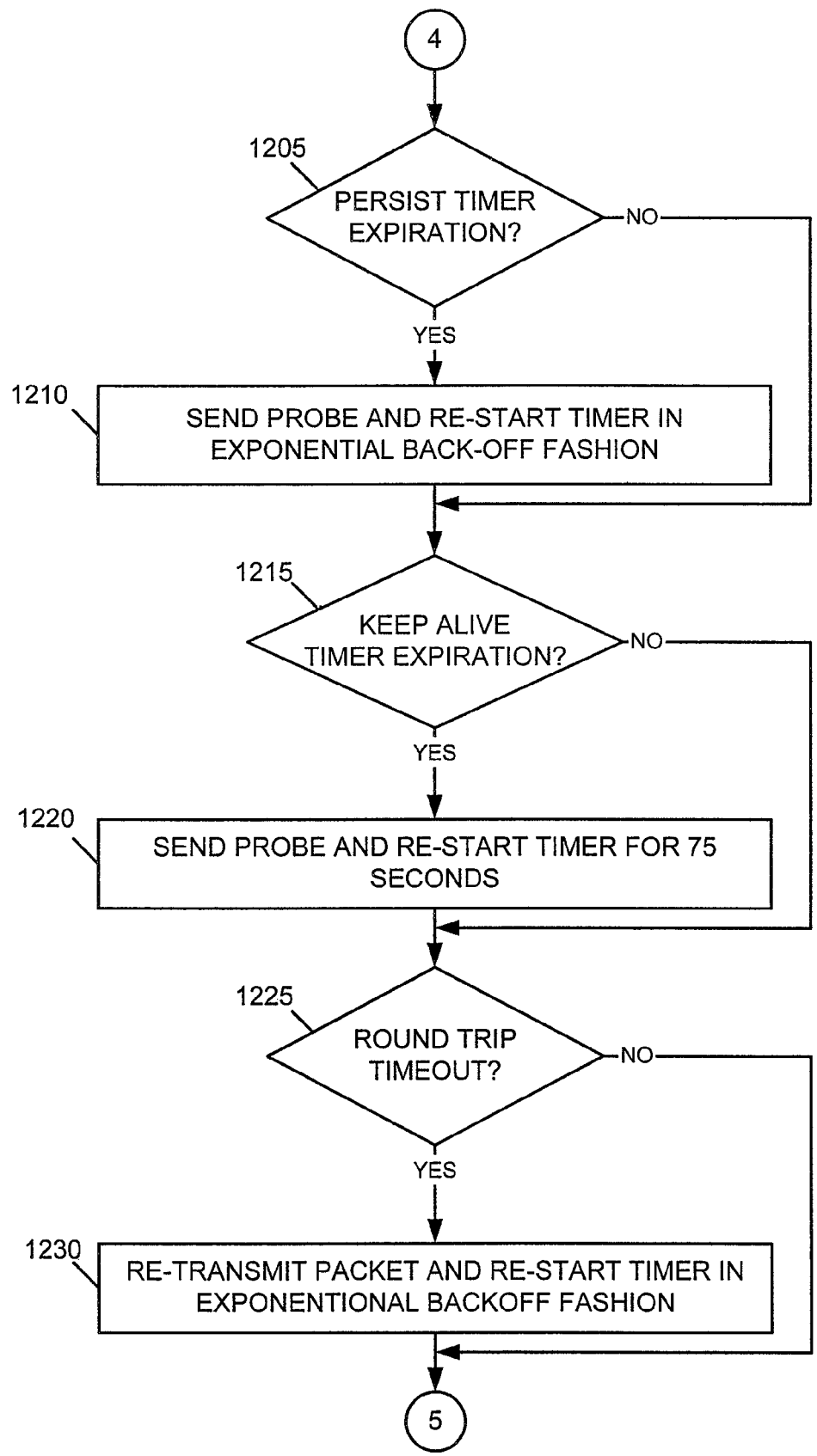
Figure 13:
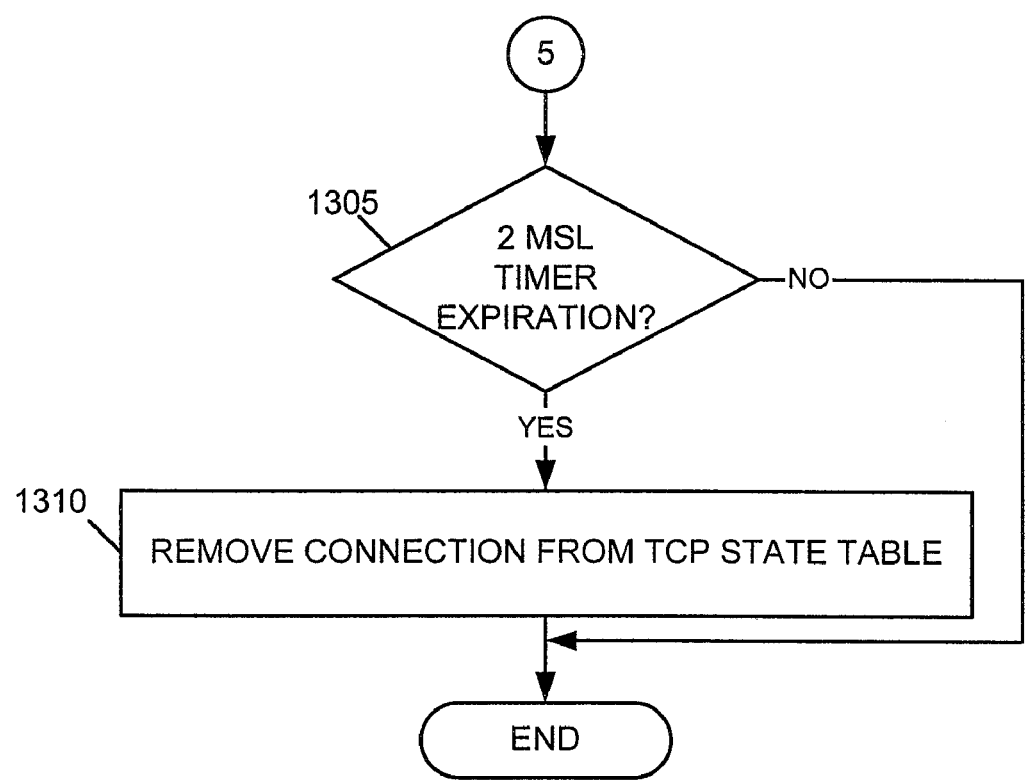

FIGS. 11-13 are flowcharts of exemplary TCP/IP timer processing according to an implementation consistent with principles of the invention. One skilled in the art will recognize that the processing of FIGS. 11-13 may be implemented as logic-level/register-level hardware in TCP/IP timer processing logic 310 of fast processing path 215. TCP/IP timer processing logic 310 may implement various TCP timers. For each TCP/IP connection, a total of five timers may be maintained. These timers may include an interval timer, a re-transmission timer, a persist timer, a keep-alive timer, and a 2MSL timer. The interval timer may expire on every 500 ms interval. The re-transmission timer may determine the time interval the TCP/IP timer processing logic 310 may wait for an acknowledge before re-transmitting a packet. The re-transmission timer may be initially set at one second and may double for each re-transmission of the same packet. The persist timer may expire every five seconds and can be used to prevent a deadlock condition in which both the send and receiver are waiting due to loss of the acknowledge segments. The keep-alive timer may prevent a sender from having to wait forever because the other party may have crashed. The receiver sends a packet (or a segment) to probe if the sender has crashed when the keep-alive timer expires. The keep-alive timer may initially be set high (e.g., one hour) for the first probe. Subsequent probes may be sent more frequently (e.g., minutes). The exact time intervals these probes are sent are implementation specific. The 2MSL timer may measure the time a connection has been in a certain state to ensure proper tear down of a connection.

Processing may begin with a determination of whether a 500 ms interval has expired as indicated by the interval timer [act 1105]. If so, TCP state table 320 may be accessed to examine the timer valid bits for other timers [act 1110]. If the timer valid bits indicate that each timer entry is valid, then the timer may be decremented [act 1120]. A determination of whether each timer is zero may be made [act 1125]. If so, the corresponding connection may be written to timer queue 375 [act 1130]. A determination may then be made whether the persist timer has expired [act 1205]. If not, processing may continue at act 1215. If the persist timer has expired, a probe (as described above with respect to the keep-alive timer) may be sent to the sender and the persist timer may be re-started in exponential back-off fashion [act 1210].

A determination may be made whether the keep-alive timer has expired [act 1215]. If not, processing may continue at act 1225. If the keep alive timer has expired, a probe may be sent and the keep alive timer may be re-started for 75 seconds [act 1220]. A determination may further be made whether there has been a round trip time out [act 1225]. If not, the process may continue at act 1305. If there has been a round trip timeout, a corresponding packet may be re-transmitted and the round trip timer may be re-started in an exponential back-off fashion [act 1230]. Timer processing logic 310 may further determine whether the 2 MSL timer has expired [act 1305]. If so, the corresponding connection may be removed from TCP state table 320 [act 1310].

CONCLUSION

Consistent with the principles of the present invention, the overall packet processing speed of a network device may be accelerated by using a "fast path," that includes hardware-implemented TCP/IP, for processing the more common types of packets. To process the remaining, less common types of packets, a "slow path," that includes software-implemented TCP/IP may be used. By selectively processing incoming packets using either the "fast path" or the "slow path," the data stream processing rate of the network device may be significantly increased.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. While a series of acts has been described in FIGS. 5-13, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method, comprising:
   receiving, by a network device, a packet from a client device;
   parsing, by the network device, the packet to determine a characteristic of the packet;
   processing, by the network device, the packet using a hardware-implemented processing path if the characteristic of the packet includes a first characteristic that indicates that the packet is associated with a configuration of the network device;
   processing, by the network device, the packet using a software-implemented processing path if the characteristic of the packet includes a second characteristic that indicates that the packet is not associated with the configuration of the network device; and
   outputting, by the network device, the processed packet to a server device;
   where processing the packet using a hardware-implemented processing path includes processing the packet using a fast recovery technique that includes re-transmitting the packet before an expiration of a timer.

2. The method of claim 1, where a network protocol of the network device comprises transmission control protocol (TCP)/internet protocol (IP).

3. The method of claim 2, where the software-implemented processing path comprises software-implemented TCP/IP.

4. The method of claim 2, where the hardware-implemented processing path comprises hardware-implemented TCP/IP.

5. The method of claim 4, where the hardware-implemented processing path comprises at least one of:
   TCP input processing logic to processing the received packet,
   TCP output processing logic to process one or more timers associated with the hardware-implemented processing path, or
   TCP/IP timer processing logic to implement a TCP packet re-transmission and congestion prevention algorithm when the processed packet is outputted.

6. The method of claim 1, where processing the packet using a hardware-implemented processing path includes processing the packet using a fast recovery technique that includes re-transmitting the packet when a quantity of duplicate acknowledgment segments received exceeds a threshold.

7. A device, comprising:
   an interface to:
   receive a packet, and
   parse the packet to determine a characteristic of the packet;
   a hardware-implemented processing path to process the packet if the characteristic of the packet comprises a first characteristic, where the hardware-implemented processing path
   includes output processing logic to process the packet using a fast recovery technique; and
   a software-implemented processing path to process the packet if the characteristic of the packet comprises a second characteristic that is different from the first characteristic;
   where the fast recovery technique includes re-sending the packet before an expiration of a timer.

8. The device of claim 7, where a network protocol of the hardware-implemented processing path and the software-implemented processing path comprises control protocol (TCP)/internet protocol (IP).

9. The device of claim 8, where the software-implemented processing path comprises software-implemented TCP/IP.

10. The device of claim 8, where the hardware-implemented processing path comprises hardware-implemented TCP/IP.

11. The device of claim 10, where the hardware-implemented processing path comprises at least one of:
   TCP input processing logic to processing the received packet,
   TCP output processing logic to process one or more timers associated with the hardware-implemented processing path, or
   TCP/IP timer processing logic to implement a TCP packet re-transmission and congestion prevention algorithm when the processed packet is outputted.

12. The device of claim 7, where the fast recovery technique further includes re-transmitting the packet when a quantity of duplicate acknowledgment segments, received from a downstream device after an outputting of the processed packet by the device, exceeds a threshold.

13. The device of claim 7, where the first characteristic indicates that the packet is associated with a configuration of the device.

14. A non-transitory computer-readable medium storing instructions, where the instructions, when implemented by a processor of the device, cause the device to:
   receive a plurality of packets; parse the plurality packets;
   process, based on the parsing of the plurality of packets, a first packet, of the plurality of packets, using a hardware-implemented processing path, where the hardware-implemented processing path includes control protocol (TCP)/internet protocol (IP) fast processing in which the first packet is processed using a fast recovery technique; and
   process, based on the parsing of the plurality of packets, a second packet, of the plurality of packets, using a software-implemented processing path;
   where processing the first packet using a fast recovery technique includes:
   re-sending the first packet before an expiration of a re-transmit timer.

15. The non-transitory computer-readable medium of claim 14, where processing the first packet
   using a fast recovery technique includes:
   re-sending, before the expiration of the re-transmit timer, the first packet when a quantity of received duplicate acknowledgment segments, received from a downstream network device in response to outputting the processed first packet, exceeds a threshold.

16. The non-transitory computer-readable medium of claim 14, where processing the packet using a hardware-implemented processing path comprises hardware-implemented TCP/IP.

17. The non-transitory computer-readable medium of claim 14, processing the packet using a software-implemented processing path comprises software-implemented TCP/IP.

* * * * *